United States Patent [19]

Musso, Jr. et al.

[11] Patent Number: 4,886,214
[45] Date of Patent: Dec. 12, 1989

[54] DUMP TRUCK WITH INTEGRATED SPREADER SYSTEM

[75] Inventors: Charles S. Musso, Jr., Hammondsport; Tom W. Musso, Bath, both of N.Y.

[73] Assignee: Air-Flo Mfg. Co. Inc., Prattsburg, N.Y.

[21] Appl. No.: 252,671

[22] Filed: Oct. 3, 1988

[51] Int. Cl.⁴ .......................... A01C 19/00; B60P 1/04
[52] U.S. Cl. .................................. 239/676; 239/657; 222/166; 414/488; 414/489
[58] Field of Search ....................... 239/657, 672, 676; 222/164, 166; 414/488, 489, 491

[56] References Cited

U.S. PATENT DOCUMENTS

| | | | |
|---|---|---|---|
| 2,233,111 | 2/1941 | Roberts | 414/489 |
| 2,517,151 | 8/1950 | Weston | 239/672 |
| 2,805,863 | 9/1957 | Klosterman | 239/672 |
| 3,329,436 | 7/1967 | Fyrk | 239/672 |
| 3,344,993 | 10/1967 | Wilder et al. | 239/663 |
| 3,693,890 | 9/1972 | Torrey | 239/672 |
| 3,768,737 | 10/1973 | Tobias | 239/666 |
| 4,056,283 | 11/1977 | Pow | 239/657 |
| 4,162,766 | 7/1979 | Ten Broeck et al. | 239/675 |
| 4,568,028 | 2/1986 | Verseef et al. | 239/657 |
| 4,685,619 | 8/1987 | Harder | 239/657 |

*Primary Examiner*—Andres Kashnikow
*Assistant Examiner*—Christopher G. Trainor
*Attorney, Agent, or Firm*—Chilton, Alix & Van Kirk

[57] ABSTRACT

A new and improved dump truck having an integrated spreader system which permits the truck to be readily converted between a normal dump mode of operation and a spreader mode of operation. The integrated spreader system comprises a longitudinally extending conveyor structurally integrated into the bottom structure of the dump body of the truck and a spreader mounted on the truck frame at the rear of the truck.

8 Claims, 4 Drawing Sheets

DUMP TRUCK WITH INTEGRATED SPREADER SYSTEM

SUMMARY OF THE INVENTION

The present invention relates generally to dump trucks and more particularly to a new and improved dump truck having an integrated spreader system which permits use of the dump truck in both a normal dump mode of operation and a spreader mode of operation in which the material contents of the truck are dispensed via a rear spreader.

It is a principal aim of the present invention to provide a new and improved dump truck having an integrated spreader system which permits the truck to be readily converted between a normal dump mode of operation and a spreader mode of operation. In accordance with the present invention, the integrated spreader system comprises a longitudinally extending conveyor structurally integrated into the bottom structure of the dump body of the truck and a spreader mounted on the truck frame at the rear of the truck.

It is a further aim of the present invention to provide a new and improved dump truck with an integrated spreader system which does not adversely affect the capacity and strength of the dump truck in a dump mode of operation and wherein the truck can be used in a spreader mode of operation with a capacity substantially greater and a center of gravity substantially lower than conventional spreader trucks having a hopper or otherwise specially constructed or modified for spreader use.

Other objects will be in part obvious and in part pointed out more in detail hereinafter.

A better understanding of the invention will be obtained from the following detailed description and the accompany drawings of an illustrative application of the invention.

DESCRIPTION OF THE PREFERRED EMBODIMENT

Figure 1:
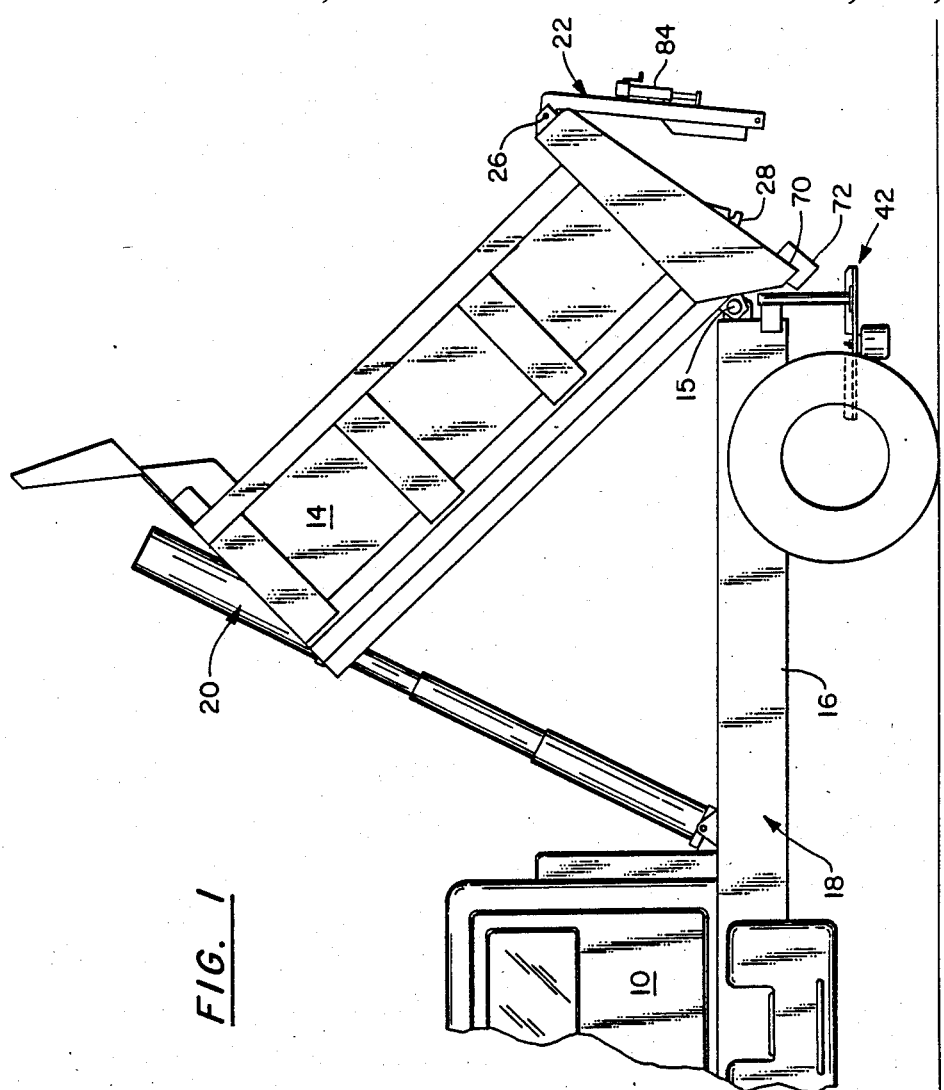
FIG. 1 is a side elevation view, partly broken away, of a dump truck incorporating an integrated spreader system in accordance with the present invention and showing the dump body of the truck in its fully raised position.
Figure 2:
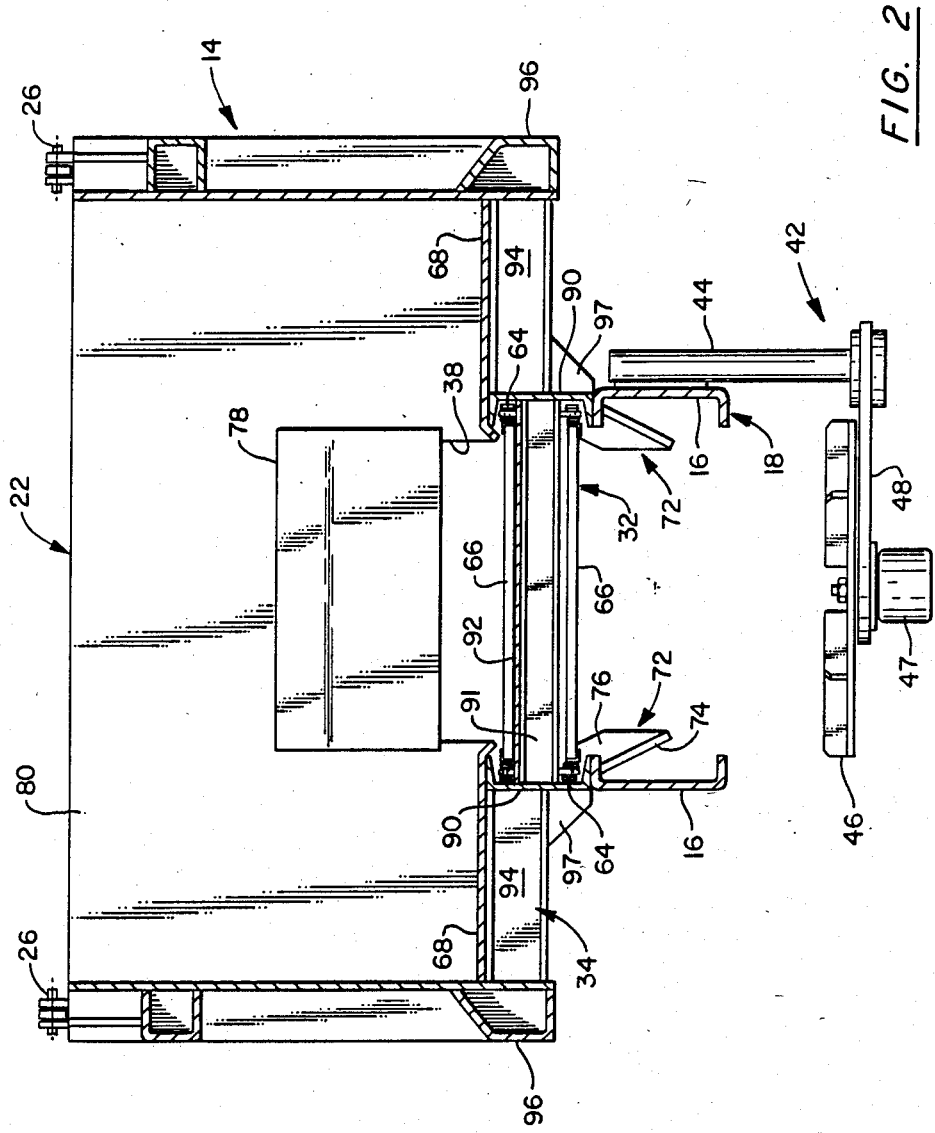
FIG. 2 is an enlarged, transverse, rearwardly looking, dump body in its lower normal position resting on the truck frame.

Referring now to the drawings in detail wherein like numerals are used to designate the same or like parts, a dump truck 10 incorporating a preferred embodiment of the present invention has a dump body 14 pivotal about a rear pivot axis 15 between a normal or horizontal position resting on a pair of parallel longitudinal beams or rails 16 of the truck frame 18 and a raised dump position shown in FIG. 1. A telescopic lift cylinder 20 is connected between the truck frame 18 and the forward end of the dump body 14 to hydraulically raise and lower the dump body 14 in a conventional manner.

A pivotal tailgate 22 of the dump body 14 is adapted to be unlatched to dump the material contents of the truck body through the tailgate opening when the dump body 14 is raised. The tailgate 22 is pivotally mounted at its top by pivot pins 26. Conventional latches 28 are provided at the bottom of the tailgate 22 on each side of the tailgate opening for latching the tailgate 22 in its normal closed position.

In accordance with the present invention, a spreader system is integrated into the dump truck 10 to provide a multiple purpose truck which may be used in both a dump mode (as described) and a spreader mode (to be described) by simple manual conversion of the truck 10 between those two modes of operation. The spreader system comprises a central longitudinally extending endless conveyor 32 integrated into the bottom structure 34 of the dump body 14, a conveyor door 36 and conveyor door opening 38 in the tailgate 22 aligned with the conveyor 32, a discharge chute 40 at the rear end of the conveyor 32 and a spinner type spreader 42. In accordance with the present invention, other types of spreaders, for example a conventional side discharge conveyor (not shown) used for conveying the material contents of the truck (e.g. sand) to either side of the truck 10, could be mounted on the truck frame 18 in place of the spinner type spreader 42.

The spreader 42 comprises a vertical post 44 affixed to the rear end of the truck frame 18 and a spinner 46 mounted on a support arm 48 pivotal about the post 44 between a retracted or stored position below and completely clear of the dump body 14 and an operating position centrally positioned directly below the discharge chute 40 and the rear end of the conveyor 32. A locking pin 50 is provided for locking the spinner support arm 48 in its retracted and operating positions. The spinner 46 may be placed in its other position by removing pin 50, manually repositioning the spinner 46 and then reinserting the locking pin 50 into aligned openings in overlying and underlying plates 52 fixed to the post 44 and spinner support arm 48. The spinner assembly 42 may incorporate a circular deflector (not shown) immediately above the spinner 46 for deflecting the material thrown outwardly by the spinner 46 downwardly onto the roadway. A suitable hydraulic drive motor 47 mounted below the arm 48 and connected directly to the spinner 46 is provided for rotating the spinner 46 in a conventional manner.

Figure 3:
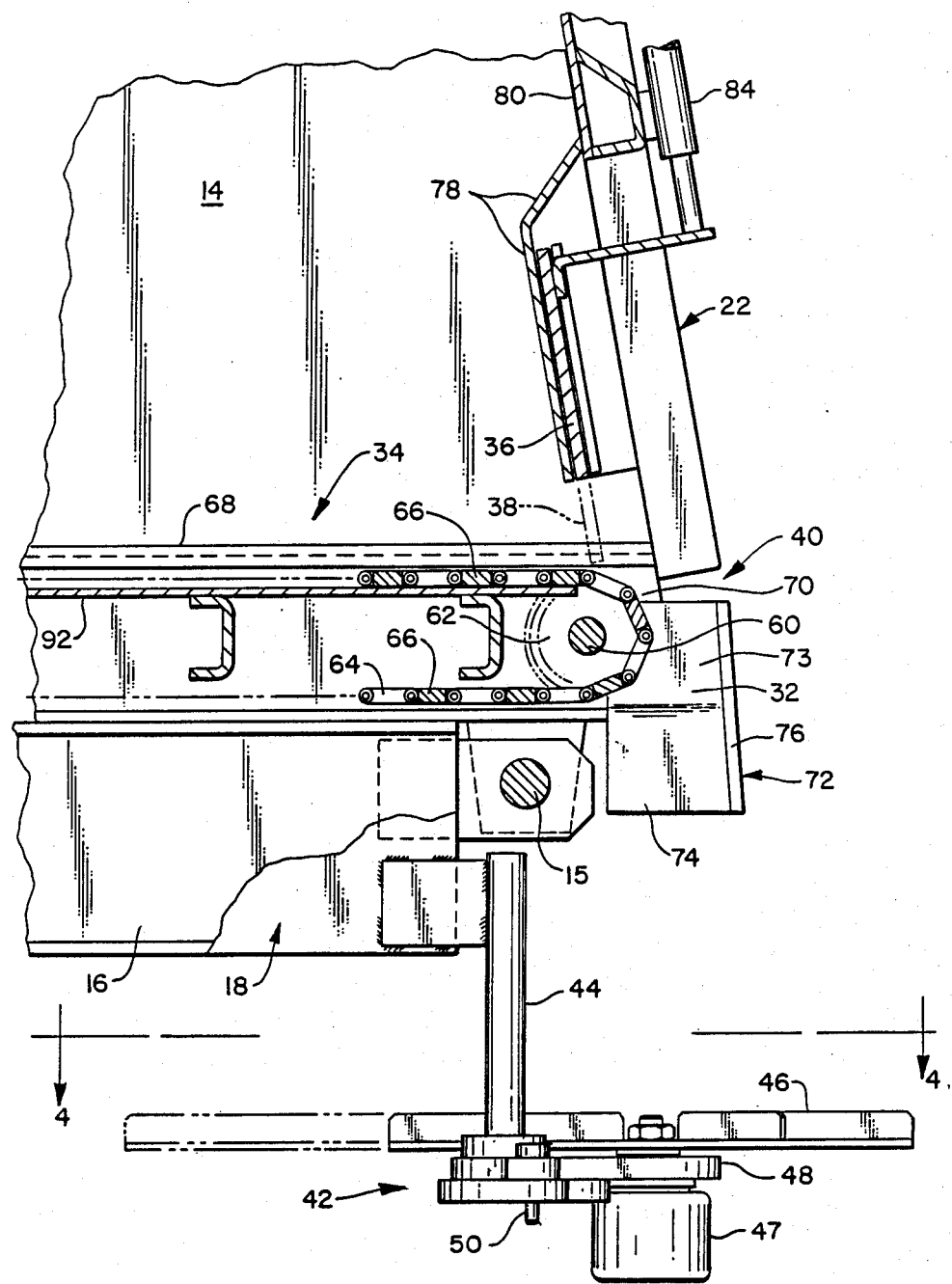
FIG. 3 is an enlarged, longitudinal section view, partly broken away and partly in section, of the rear end of the dump truck, showing the dump body in its lower normal position.
Figure 4:
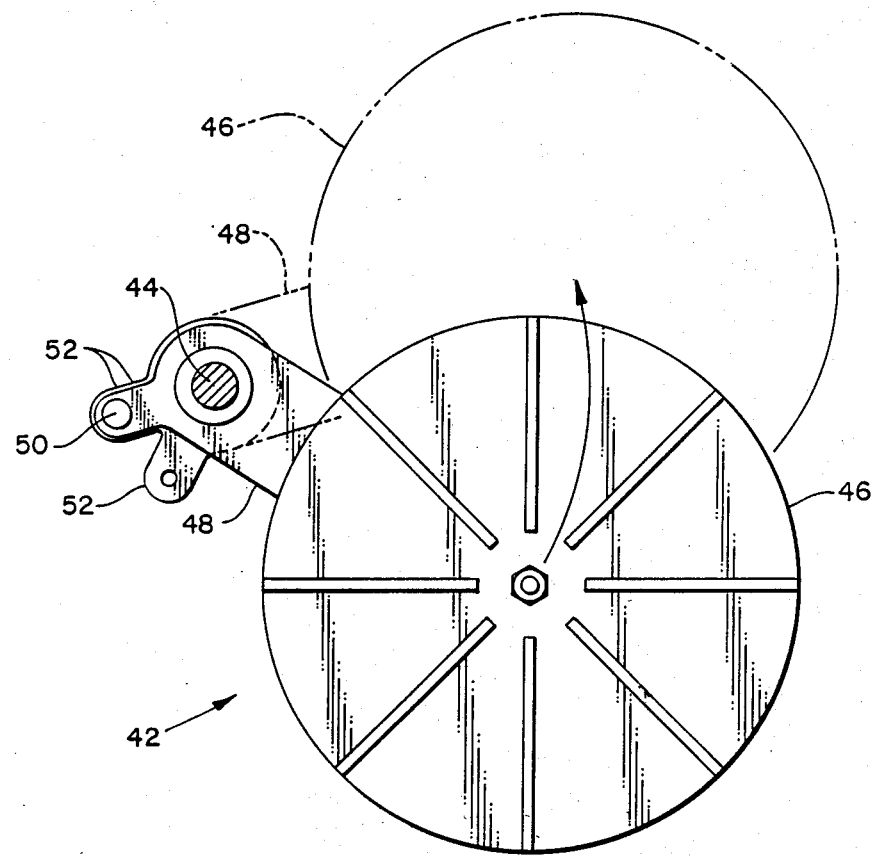
FIG. 4 is a enlarged top plan view partly in section showing a spinner type spreader of the spreader system in full lines in an operating position thereof and in broken lines in a retracted or stored position thereof.

The endless conveyor 32 comprises front and rear sprocket shafts 60 (which may be substantially identical), each having a pair of laterally spaced sprockets 62 for supporting a pair of laterally spaced conveyor drive chains 64. The front sprocket shaft 60 (not shown) is mounted so that the forward end of the conveyor 32 is slightly (e.g. one foot) rearwardly of the front inner wall of the dump body 14. As shown in FIG. 3, the rear sprocket shaft 60 is approximately directly below the conveyor door opening 38 in the tailgate 22 when the tailgate 22 is closed. A suitable hydraulic drive mechanism (not shown) is connected to the rear sprocket shaft 60 for driving the conveyor chains 64. The flights 66 of the conveyor 32 are suitably connected to the links of the conveyor chains 64. The flights 66 preferably are flat bars (e.g. one-half inch thick and two inches wide) spaced about four inches apart. The upper plane of the conveyor flights 66 is recessed slightly (e.g. two inches) below the flat inner bottom 68 of the remaining bottom structure 34 of the dump body 14.

The rear end of the conveyor 32 extends rearwardly beyond the conveyor door 36 to approximately the transverse rear end plane of the spaced rear end sections 70 of the bottom structure 34. The discharge chute 40 is provided in part by a lateral opening between the spaced rear end sections 70 and in part by a pair of opposed discharge guides 72 mounted between the rear end sections 70. Each discharge guide 72 comprises a first inner plate 73 extending rearwardly of the end sections 70 and having a lower downwardly and laterally inwardly projecting section 74 which forms a chute portion for directing the material discharged from the conveyor 32 downwardly and inwardly onto the spinner 46. Each guide 72 also comprises a rear generally vertical end plate 76 welded to the rear end of the first plate 73 for assisting in directing the dump body contents downwardly onto the desired area of the spinner 46.

The conveyor door 36 is mounted within an integral, three-sided hood 78 of the tailgate 22 about six (6) inches inwardly or forwardly of the remaining inner flat, generally vertical face 80 of the tailgate 22. The conveyor door 36 is generally vertically slidable within the hood 78 between a raised open position shown in full lines in FIG. 3 and a lower closed position shown in part in broken lines in FIG. 3. In its lower closed position, the conveyor door 36 substantially completely closes the conveyor opening 38 in a generally vertical plane which is parallel and adjacent to and slightly rearwardly of the axis of the rear sprocket shaft 60 and forwardly of the rear end of the conveyor 32. When closed, the conveyor door 36 prevents inadvertent discharge of the material contents of the dump body 14 without hindering the opening and closing of the tailgate 22. A suitable screw mechanism 84 is welded to the tailgate 22 to provide for manually opening and closing the conveyor door 36.

The truck 10 can be converted to its spreader mode of operation merely by manually raising the conveyor door 36, removing the spinner locking pin 50, manually pivoting the spinner 46 from its retracted position to its operating position and reinserting the pin 50 to lock the spinner 46 in place. The truck 10 can be converted back to its dump mode by closing the conveyor door 36 and placing the spinner 46 in its retracted position.

The structural components of the conveyor 32 are integrated into the remaining bottom structure 34 of the dump body 14. The conveyor 32 is structurally supported by a pair of parallel, inwardly facing, channel beams 90 extending longitudinally the full length of the dump body 14 between its forward and rear ends and providing the principal longitudinal structural members of the dump body 14. Those central longitudinal beams 90 rest on the rails 16 of the vehicle frame 18 when the dump body 14 is in its lower or normal position. The front and rear sprocket shafts 60 of the conveyor are rotatably supported on opposed bearings mounted on those longitudinal channel beams 90. The conveyor sprockets 62 and drive chains 64 are mounted between the upper and lower inwardly projecting flanges of the longitudinal beams 90. A plurality of longitudinally spaced transverse beams 91, which may be channel beams but which are preferably I-beams, are welded to the central longitudinal beams 90 between the upper and lower planes of the flights 60 of the conveyor 32.

An intermediate bottom or bed plate 92 is welded to the top of each intermediate beam 91 to provide an intermediate bottom section, recessed below the remaining bottom 68 of the dump body 14, which provides a support for the drive chains 64 and conveyor flights 66.

Outer transverse I-beams 94, preferably having the same cross section as the central transverse beams 91, are welded to the central longitudinal beams 90 and longitudinal structural members 96 forming the longitudinal edges of the bottom and side walls of the dump body 14. Lower gussets 97 are welded to the outer transverse I-beams 94 and central longitudinal beams 90 for additional strength. The lift cylinder 20 is mounted between the forward ends of the central longitudinal beams 90. The discharge chute is formed in part by the opening between the rear ends of the beams 90 and the opposed discharge guides 72 are mounted within and welded to the beams 90.

By virtue of the described bottom structure 34, the structural integrity of the dump body 14 is maintained notwithstanding the provision of a central longitudinally extending conveyor 32 having a transverse width approximately one-third the inside width of the dump body 14. With the integrated structure, use of the truck 10 in its dump mode is not limited by the provision of the integrated conveyor 32 and frame mounted spinner 46. The capacity and strength of the dump body are not adversely affected. In the spreader mode of operation of the dump truck 10, the center of gravity of the truck is substantially lower and the dump body capacity is substantially greater than in conventional spreader trucks having a hopper or otherwise specially constructed or modified for spreader use. Also, in the spreader mode, nearly the entire contents of the dump body 14 can be discharged by the recessed conveyor 32, merely by raising the dump body slightly after most of the contents have been dispensed, to shift the remaining contents to the rear of the dump body. Most of the remaining contents can then be discharged by the conveyor 32 preferably after lowering the dump body back to its lower normal position for spreader mode operation.

As will be apparent to persons skilled in the art, various modifications, adaptations and variations of the foregoing specific disclosure can be made without departing from the teachings of the present invention.

We claim:

1. In a dump truck having a truck frame with longitudinally extending rails, a dump body having a forward end and a rear end and pivotally mounted at the rear end thereof on the truck frame, a lift cylinder connected between the truck frame and the forward end of the dump body for raising and lowering the dump body between a lower normal position thereof resting on the truck frame and an upper raised position thereof, the dump body forming a receptacle with a generally flat bottom, an upright sidewall at each side of the bottom and a rear tailgate opening between the sidewalls and having a tailgate with an upper end and pivotal at the upper end thereof between an open position thereof and a closed position thereof closing the tailgate opening and latching means for latching the tailgate in its closed position, the dump body having a longitudinally extending endless conveyor having a rear end and operable for conveying the material contents of the dump body receptacle rearwardly for being discharged off the rear end of the conveyor, and a spreader mounted on the truck for spreading the material contents of the dump body receptacle discharged off the rear end of the conveyor, the improvement wherein the dump body has a bottom structure, providing the generally flat bottom of the dump body receptacle, with the longitudinally extending conveyor structurally integrated therein to form part of the flat bottom of the dump body receptacle, wherein the tailgate has an inner wall with a forwardly projecting hood between the sidewalls having a conveyor door opening aligned with the conveyor forwardly of the remaining inner wall of the tailgate and the rear end of the conveyor, and a conveyor door, mounted on the tailgate, adjustable between a lower closed position thereof closing the conveyor opening and an upper fully open position thereof, wherein the rear end of the conveyor does not extend rearwardly as far as the remaining generally flat bottom of the dump body receptacle, and wherein the spreader is mounted on the truck frame at the rear end thereof and comprises shiftable mounting means for shifting the spreader between a rear spreader position thereof below the rear end of the conveyor for use of the truck in a spreader mode of operation and a forward retracted position thereof forwardly of the tailgate opening and free of the dump body for use of the truck in a dump mode of operation.

2. A dump truck according to claim 1 wherein the bottom structure of the dump body comprises a pair of transversely spaced, longitudinally extending main beams, wherein the conveyor is mounted on and between said main beams and comprises a rear conveyor shaft extending between and supported by said main beams and longitudinally positioned so that the conveyor extends rearwardly of said conveyor opening and the conveyor door, in the closed position thereof, prevents inadvertent discharge of the material contents of the dump body receptacle.

3. A dump truck according to claim 1 wherein the spreader comprises a post depending from the rear end of the truck frame, a support arm mounted on the post below the truck frame, a spinner rotatably mounted on the support arm, and motor means mounted on the support arm for rotating the spinner, the shiftable mounting means providing for shifting the spinner between a forward retracted position thereof and a rear operating position thereof below the rear end of the conveyor.

4. A dump truck according to claim 3 wherein the post is fixed to the rear end of the truck frame and the support arm is pivotably mounted on the post for pivotal movement of the spinner between its said forward retracted position and rear operating position.

5. In a dump truck having a truck frame with longitudinally extending rails, a dump body having a forward end and a rear end and pivotally mounted at the rear end thereof on the truck frame, a lift cylinder connected between the truck frame and the forward end of the dump body for raising and lowering the dump body between a lower normal position thereof resting on the truck frame and an upper raised position thereof, the dump body forming a receptacle with a generally flat bottom, an upright sidewall at each side of the bottom and a rear tailgate opening between the sidewalls and having a tailgate with an upper end and pivotal at the upper end thereof between an open position thereof and a closed position thereof closing the tailgate opening and latching means for latching the tailgate in its closed position, the dump body having a longitudinally extending endless conveyor having a rear end and operable for conveying the material contents of the dump body receptacle rearwardly for being discharged off the rear end of the conveyor, and a spreader mounted on the truck for spreading the material contents of the dump body receptacle discharged off the rear end of the conveyor, the improvement wherein the dump body has a bottom structure, providing the generally flat bottom of the dump body receptacle, with the longitudinally extending conveyor structurally integrated therein to form part of the generally flat bottom of the dump body receptacle, wherein the tailgate has an inner wall with a forwardly projecting hood between the sidewalls having a conveyor door opening aligned with the conveyor forwardly of the remaining inner wall of the tailgate and the rear end of the conveyor, and a conveyor door, mounted on the tailgate, adjustable between a lower closed position thereof closing the conveyor opening and an upper fully open position thereof, wherein the rear end of the conveyor does not extend rearwardly as far as the remaining generally flat bottom of the dump body receptacle and wherein the bottom structure of the dump body comprises a pair of transversely spaced, longitudinally extending main beams below the generally flat bottom of the dump body receptacle and laterally positioned to engage and rest upon said longitudinally extending rails of the truck frame in the lower normal position of the dump body, wherein said main beams constitute the main structural beams of the bottom structure and sides for the conveyor, wherein the conveyor is mounted on and between said main beams and comprises a rear conveyor shaft extending between and supported by said main beams and longitudinally positioned so that the conveyor extends rearwardly of said conveyor opening and the conveyor door, in the closed position thereof, prevents inadvertent discharge of the material contents of the dump body receptacle.

6. A dump truck according to claim 5 wherein the conveyor comprises an endless chain of conveyor flights passing along upper and lower generally parallel sections of flights between the main beams, wherein the bottom structure further comprises central transverse beams extending between the main beams between the upper and lower sections of flights, longitudinal extending edge structures forming the outer side edges of the bottom structure, outer transverse beams extending between the main beams and said edge structure, strengthening gussets mounted between the outer transverse beams and the main beams, a main bottom plate mounted on the outer transverse beams, and a bed plate mounted on the central transverse beams recessed below the main bottom plate and forming a support for the upper section of flights.

7. A dump truck according to claim 5 wherein the conveyor door is mounted for sliding movement between its open and closed positions within a plane parallel, adjacent to and slightly rearwardly of the plane of the rear conveyor shaft.

8. In a dump truck having a truck frame with longitudinally extending rails, a dump body having a forward end and a rear end and pivotally mounted at the rear end thereof on the truck frame, a lift cylinder connected between the truck frame and the forward end of the dump body for raising and lowering the dump body between a lower normal position thereof resting on the truck frame and an upper raised position thereof, the dump body forming a receptacle with a generally flat bottom, an upright sidewall at each side of the bottom and a rear tailgate opening between the sidewalls and having a tailgate with an upper end and pivotal at the upper end thereof between an open position thereof and a closed position thereof closing the tailgate opening and latching means for latching the tailgate in its closed position, the dump body having a longitudinally extending endless conveyor having a rear end and operable for conveying the material contents of the dump body receptacle rearwardly for being discharged off the rear end of the conveyor, and a spreader mounted on the truck for spreading the material contents of the dump body receptacle discharged off the rear end of the conveyor, the improvement wherein the dump body has a bottom structure, providing the generally flat bottom of the dump body receptacle, with the longitudinally extending conveyor structurally integrated therein to form part of the generally flat bottom of the dump body receptacle, wherein the tailgate has an inner wall with a forwardly projecting hood between the sidewalls forming a conveyor door opening aligned with the conveyor forwardly of the remaining inner wall of the tailgate and the rear end of the conveyor, and a conveyor door, mounted on the tailgate, adjustable between a lower closed position thereof closing the conveyor opening and an upper fully open position thereof, wherein the bottom structure of the dump body comprises a pair of transversely spaced, longitudinally extending main beams below the generally flat bottom of the dump body receptacle and laterally positioned to engage and rest upon said longitudinally extending rails of the truck frame in the lower normal position of the dump body, wherein said main beams constitute the main structural beams of the bottom structure and sides for the conveyor, wherein the conveyor is mounted on and between said main beams and comprises a rear conveyor shaft extending between and supported by said main beams and longitudinally positioned so that the conveyor extends rearwardly of said conveyor opening and the conveyor door, in the closed position thereof, prevents inadvertent discharge of the material contents of the dump body receptacle.

* * * * *